US006624873B1

(12) United States Patent
Callahan, Jr. et al.

(10) Patent No.: US 6,624,873 B1
(45) Date of Patent: Sep. 23, 2003

(54) MATRIX-ENCODED SURROUND-SOUND CHANNELS IN A DISCRETE DIGITAL SOUND FORMAT

(75) Inventors: Raymond E. Callahan, Jr., Torrance, CA (US); Ioan R. Allen, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 09/072,707

(22) Filed: May 5, 1998

(51) Int. Cl.[7] .......................... G03B 31/02; G03B 31/00

(52) U.S. Cl. ............................ 352/27; 352/11; 352/26; 352/37

(58) Field of Search ....................................... 352/1–37

(56) References Cited

U.S. PATENT DOCUMENTS

| | | | | |
|---|---|---|---|---|
| 2,714,633 | A | 8/1955 | Fine | 369/47.16 |
| 3,973,839 | A | 8/1976 | Stumpf et al. | 352/5 |
| 4,024,344 | A | 5/1977 | Dolby et al. | 381/27 |
| 4,074,083 | A | 2/1978 | Berkovitz et al. | 369/88 |
| 4,256,389 | A | 3/1981 | Engebretson | 352/11 |
| 4,306,781 | A | 12/1981 | Mosely | 352/37 |
| 4,385,814 | A | 5/1983 | Elliott | 352/92 |
| 4,577,305 | A | 3/1986 | Allen et al. | 369/86 |
| 4,680,796 | A | 7/1987 | Blackmer et al. | 381/23 |
| 4,941,177 | A | 7/1990 | Mandell et al. | 381/22 |
| 5,046,098 | A | 9/1991 | Mandell et al. | 381/22 |
| 5,155,510 | A | 10/1992 | Beard | 352/27 |
| 5,291,557 | A | 3/1994 | Davis et al. | 381/22 |
| 5,327,182 | A | 7/1994 | Kohut et al. | 352/27 |
| 5,386,255 | A | 1/1995 | Beard et al. | 352/5 |
| 5,386,256 | A | 1/1995 | Taylor et al. | 352/27 |
| 5,450,146 | A | 9/1995 | Chedeville et al. | 352/31 |
| 5,451,942 | A | 9/1995 | Beard et al. | 341/50 |
| 5,453,802 | A | 9/1995 | Kohut et al. | 352/27 |
| 5,463,424 | A | 10/1995 | Dressler | 348/485 |
| 5,471,263 | A | 11/1995 | Odaka | 352/27 |
| 5,485,232 | A | 1/1996 | Saito et al. | 352/5 |
| 5,508,761 | A | 4/1996 | Saito et al. | 352/26 |
| 5,524,054 | A | 6/1996 | Spilli | 381/18 |
| 5,537,165 | A | 7/1996 | Miyamori et al. | 352/27 |
| 5,544,140 | A | 8/1996 | Seagrave et al. | 369/59 |
| 5,550,603 | A | 8/1996 | Yoshimura et al. | 352/27 |
| 5,583,962 | A | 12/1996 | Davis et al. | 395/2.38 |
| 5,596,380 | A | 1/1997 | Ozaki et al. | 352/30 |
| 5,600,617 | A | 2/1997 | Saito | 369/97 |
| 5,602,923 | A | 2/1997 | Ozaki et al. | 381/18 |

(List continued on next page.)

FOREIGN PATENT DOCUMENTS

| | | |
|---|---|---|
| EP | 0119101 | 9/1984 |
| GB | 2006583 | 5/1979 |
| WO | WO 0004744 | 1/2000 |

OTHER PUBLICATIONS

"Motion Picture Sound," http://ac.acusd.edu/History/recording/motionpicture.html and other items from Internet, (Apr. 29, 1998).

(List continued on next page.)

*Primary Examiner*—Rodney Fuller
(74) *Attorney, Agent, or Firm*—Thomas A. Gallagher, Esq.; Gallagher & Lathrop

(57) ABSTRACT

More than two surround sound channels are provided within the format of a digital soundtrack system designed to provide only two surround sound channels by matrix encoding from three to five additional surround sound channels into two "discrete" surround sound channels. The digital audio stream of the digital soundtrack system designed to provide only two surround sound channels remains unaltered, thus providing compatibility with existing playback equipment. The format of the media carrying the digital soundtracks also is unaltered. The "discreteness" of the digital soundtrack system is not audibly diminished by employing matrix technology to surround sound channels, particularly if active matrix decoding is employed.

18 Claims, 4 Drawing Sheets

U.S. PATENT DOCUMENTS

| | | | | | |
|---|---|---|---|---|---|
| 5,617,158 | A | | 4/1997 | Miyamori et al. | 352/37 |
| 5,621,489 | A | | 4/1997 | Kohut et al. | 352/27 |
| 5,638,343 | A | | 6/1997 | Ticknor | 369/4 |
| 5,639,585 | A | | 6/1997 | Callahan, Jr. et al. | 430/140 |
| 5,666,185 | A | | 9/1997 | Odaka | 352/27 |
| 5,677,752 | A | | 10/1997 | Miyamori et al. | 352/5 |
| 5,677,753 | A | | 10/1997 | Miyamori et al. | 352/5 |
| 5,677,994 | A | | 10/1997 | Miyamori et al. | 395/2.92 |
| 5,701,346 | A | | 12/1997 | Herre et al. | 381/18 |
| 5,710,752 | A | | 1/1998 | Seagrave et al. | 369/97 |
| 5,717,765 | A | | 2/1998 | Ozaki et al. | 381/18 |
| 5,796,844 | A | * | 8/1998 | Griesinger | 381/18 |
| 5,798,818 | A | * | 8/1998 | Derderian et al. | 352/31 |
| 5,802,181 | A | * | 9/1998 | Ozaki et al. | 381/18 |

OTHER PUBLICATIONS

"Surround Sound Past, Present and Future," Dolby Laboratories, Inc., San Francisco, 1997.

James K. Waller, Jr., "The Circle Surround 5.5 5–Channel Suround System," http://www.surround.nte/whitepap.html, RSP Technologies, ( Dec. 27, 1997).

Dolby CPF 500 Digital Cinema Processor brochure, Dolby Laboratories, Inc., San Francisco, 1996.

Dolby CP65 Cinema Processor brochure, Dolby Laboratories, Inc., San Francisco, 1996.

Dolby CP45 Cinema Processor brochure, Dolby Laboratories, Inc., San Francisco, 1996.

Digital Audio Compression (AC–3) ATSC Standard, Foreward, ATSC, Dec. 20, 1995, one page.

Larry Blake, "Digital Sound in the Cinema," MIX, p. 116–122, ( Oct. 11, 1995).

"Dolby SA5 Surround Adapter," Dolby Laboratories, Inc. Information, San Farncisco, Aug., 1979, p. 1965–1967.

J. G. Woodward, "Quadraphony—A Review," Journal of the Audio Engineering Society, Audio Engineering Society, p. 643–654, ( Oct. 11, 1997).

Benjamin B. Bauer, et al., "Quadraphonic Matrix Perspective—Advances in SQ Encoding and Tecoding Technology," Journal of the Audio Engineering Society, Audio Engineering Society, Inc., p. 102–110, ( Jun. 11, 1973).

John Eargle, "4–2–4 Matrix Systems: Standards, Practice, and Interchangeability," Journal of the Audio Engineering Society, Audio Engineering Society, Inc., p. 132–138, ( Dec. 11, 1972).

Ryosuke Itoh, "Proposed Universal Encoding Standards for Campatible Four–Channel Matrixing," Journal of the Audio Engineering Society, Audio Engineering Society, Inc., p. 125–131, ( Apr. 11, 1972).

John M. Eargle, "Multichannel Stero Matrix Systems: An Overview," Journal of the Audio Engineering Society, Audio Engineering Society, Inc., p. 94–101, ( Jul. 11, 1971).

John G. Frayne, "A Compatible Photographic Stereophonic Sound System," Journal of the SMPTE, SMPTE, ( Jun. 11, 1955).

"True Surround Sound With Dolby AC–3," by Peter Leyshan, Copyright ©1995, 2 pages. http://www.geocities.com/ResearchTriangle/7035/ac3page.html.

* cited by examiner

MATRIX-ENCODED SURROUND-SOUND CHANNELS IN A DISCRETE DIGITAL SOUND FORMAT

INCORPORATION BY REFERENCE

Each of the following United States Patents is hereby incorporated by reference in its entirety: U.S. Pat. Nos. 4,799,260; 5,046,098; 5,155,510; 5,319,713; 5,386,255; 5,450,146; 5,451,942; 5,453,802; 5,550,603; 5,544,140; 5,583,962; 5,600,617; 5,602,923; 5,621,489; 5,639,585; 5,710,752; 5,717,765; and 5,757,465.

FIELD OF THE INVENTION

This invention relates to the field of multichannel audio. More particularly the invention relates to matrix-encoded surround-sound channels in a discrete typically digital sound format for motion picture soundtracks.

DESCRIPTION OF RELATED ART

Optical soundtracks for motion pictures were first demonstrated around the turn of the century, and since the 1930's have been the most common method of presenting sound with motion pictures. In modern systems, the transmission of light through the film is modulated by variations in soundtrack width, where an ideally transparent varying width of soundtrack is situated within an ideally opaque surrounding. This type of soundtrack is known as "variable area".

In an effort to reduce distortion due to non-uniform light over the soundtrack width and other geometric distortion components, the "bilateral" variable area track was introduced. This format has two modulated edges, identical mirror images around a fixed centerline. A later development, which is now the standard monophonic analog optical soundtrack format, is called "dual bilateral" (or "double bilateral" or "duo-bilateral") sound track. This format has two bilateral elements within the same soundtrack area, thus providing further immunity from illumination non-uniformity errors. A useful discussion of the history and potential of optical soundtracks can be found in "The Production of Wide-Range, Low-Distortion Optical Sound Tracks Utilizing the Dolby Noise Reduction System" by Ioan Allen in *J. SMPTE,* September 1975, Volume 84, pages 720–729.

In the mid 1970's Stereo Variable Area (SVA) tracks became increasingly popular, in which two independently modulated bilateral soundtracks are situated side by side in the same area as the normal monophonic (mono) variable area track.

In 1976, Dolby Laboratories introduced its four-channel stereo-optical version of Dolby Stereo, which employed audio matrix encoding and decoding in order to carry 4 channels of sound on the two SVA optical tracks. "Dolby" and "Dolby Stereo" are trademarks of Dolby Laboratories Licensing Corporation. Dolby Stereo for SVA optical tracks employs the "MP" matrix, a type of 4:2:4 matrix system that records four source channels of sound (left, right, center and surround) on the two SVA tracks and reproduces four channels. Although the original Dolby Stereo stereo-optical format employed Dolby A-type analog audio noise reduction, in the mid-1980's Dolby Laboratories introduced an improved analog audio processing system, Dolby SR, which is now used in Dolby Stereo optical soundtrack films.

Multichannel motion picture sound was employed commercially at least as early as "Fantasound" in which the four-channel soundtrack for the motion picture Fantasia was carried in respective optical tracks on a separate film synchronized with the picture-carrying film. Subsequently, in the 1950s, various "magnetic stripe" techniques were introduced in which multiple channels of sound were recorded in separate tracks on magnetizable materials affixed to the picture-carrying film. Typically, magnetic striped 35 mm film carried three or four separate soundtracks while magnetic striped 70 mm film carried six separate soundtracks.

Although most motion picture films with magnetic striped soundtracks carried a separate channel in each magnetic track, at least one film released in the mid-1970s (Tommy in "Quintaphonic" sound) employed matrix encoding—the normally left and right tracks were matrix encoded with left front, left rear, right front and right rear sound channels. The third, center channel remained discrete. The phase sensitive matrix system suffered from sound image wandering due to variations in phasing between the matrix-encoded tracks.

In a variation of PerspectaSound used in some prints of the motion picture Around the World in Eighty Days, four magnetic tracks on 35 mm carried left, center, right and surround channel information, respectively. In addition to the surround information, the fourth track carried subaudible tones for directing the surround sound to a selected bank of three banks of surround sound loudspeakers. Early forms of PerspectaSound employed a subaudible control tone on the monaural soundtrack in order to direct the sound to selected loudspeakers behind the screen.

Magnetic striped 35 mm films became obsolete after the introduction of the Dolby Stereo 35 mm optical format.

In another version of Dolby Stereo introduced in the 1970s, Dolby noise reduction was applied to four of the six discrete audio tracks of magnetic striped 70 mm motion picture film. As a feature of this Dolby Stereo format, tracks 1 and 2 (recorded in the magnetic stripe located between the left edge of the film and the left-hand sprocket holes) carry the left main screen channel and low-frequency-only "bass extension" information, respectively; track 3 (recorded in the magnetic stripe located between the left-hand sprocket holes and the picture) carries the center main screen channel; track 4 (recorded in the magnetic stripe located between the picture and the right-hand sprocket holes) also carries low-frequency-only "bass extension" information; and tracks 5 and 6 (recorded in the magnetic stripe located between the right sprocket holes and the right edge of the film) carry the right main screen channel and the single surround channel, respectively. Dolby noise reduction is not applied to the bass extension information.

In a variation of Dolby Stereo for 70 mm magnetic soundtrack motion picture films, two surround channels are provided instead of one (referred to as "split surrounds" or "stereo surrounds"). Tracks 1, 3, 5 and 6 are the same as in conventional Dolby Stereo 70 mm; however, mid- and high-frequency left surround information is recorded (with Dolby noise reduction) in track 2 along with the low-frequency bass information, and mid- and high-frequency right surround information is recorded (with Dolby noise reduction) in track 4 along with the low-frequency bass information. When reproduced in a theater, the mid- and high-frequency stereo surround information on tracks 2 and 4 is fed to the left and right surround speakers, respectively, combined with monophonic surround bass information from track 6. This variation of Dolby Stereo 70 mm was an early form of the now-common "5.1" channel (sometimes referred to as six channel) configuration: left, center, and right main screen channels, left and right surround sound channels and a low-frequency bass enhancement (LFE) or subwoofer channel. The LFE channel, which carries much less information than the other full-bandwidth channels, is now referred to as "0.1" channels.

In spite of these advances in analog soundtrack fidelity, film soundtracks had long been considered a candidate for digital coding due to the high cost of 70 mm magnetic soundtrack films and the perceived limitations of the matrix technology employed in 35 mm optical soundtrack films. In 1992, Dolby Laboratories introduced its Dolby Digital optical soundtrack format for 35 mm motion picture film. Dolby Digital is a trademark of Dolby Laboratories Licensing Corporation. 5.1 channel (left, center, right, left surround, right surround and LFE) soundtrack information is digitally encoded employing Dolby Laboratories AC-3 perceptual encoding scheme. That encoded information is in turn encoded as blocks of symbols optically printed between the film's sprocket holes along one side of the film. The analog SVA tracks are retained for compatibility. Details of the Dolby Digital 35 mm film format are set forth in U.S. Pat. Nos. 5,544,140, 5,710,752 and 5,757,465. The basic elements of the Dolby AC-3 perceptual coding scheme are set forth in U.S. Pat. No. 5,583,962. Details of a practical implementation of Dolby AC-3 are set forth in Document A/52 of the United States Television Systems Committee (ATSC), "Digital Audio Compression Standard (AC-3)," Dec. 20, 1995 available on the world wide web of the Internet. The Dolby Digital system typically provides the channel discreteness of 70 mm magnetic soundtrack films while preserving the low cost and compatibility of 35 mm optical soundtrack films.

Subsequently, in 1993, Sony introduced its Sony Dynamic Digital Sound (SDDS) format for 35 mm motion picture film. In the SDDS system "7.1" channel (sometimes referred to as eight channel) (left, left center, center, right center, right, left surround, right surround and LFE) soundtrack information is digitally encoded using a form of Sony's ATRAC perceptual coding. That encoded information is in turn encoded as strips of symbols optically printed between each edge of the film and the nearest sprocket holes. Sony, Sony Dynamic Digital Sound, SDDS, and ATRAC are trademarks. Some details of the Sony SDDS system are set forth in U.S. Pat. Nos. 5,550,603; 5,600,617; and 5,639,585.

Also in 1993, Digital Theater Systems Corporation ("DTS") introduced a separate medium digital soundtrack system in which the 35 mm motion picture film carries a time code track for the purpose of synchronizing the picture with a CD-ROM encoded using a type of perceptual coding with 5.1 channel soundtrack information (left, center, right, left surround, right surround and LFE). DTS is a trademark. Some details of the DTS system are set forth in U.S. Pat. Nos. 5,155,510; 5,386,255; 5,450,146; and 5,451,942.

Further details of the Dolby Digital, Sony SDDS and DTS systems are set forth in "Digital Sound in the Cinema" by Larry Blake, Mix, October 1995, pp. 116, 117, 119, 121, and 122.

FIG. 1 shows an idealized loudspeaker arrangement for a typical theater 10 employing the Dolby Digital or the DTS 5.1 channel systems. The left channel soundtrack L is applied to left loudspeaker(s) 12, the center channel soundtrack C is applied to the center loudspeaker(s) 14 and the right channel soundtrack R is applied to the right loudspeaker(s) 16, all of which loudspeakers are located behind the motion picture screen 18. These may be referred to as main screen channels. The left surround channel $L_S$ is applied to left surround loudspeaker(s) 20 shown at the rear portion of the left wall 22 of the theater. The right surround channel $R_S$ is applied to right surround loudspeaker(s) 24 shown at the rear portion of the right wall 26 of the theater. In normal practice, there are a plurality of left surround loudspeakers spaced along the left side wall of the theater starting from a location about midway between the front and rear of the theater and extending to the rear wall 28 and then along the rear wall to a location near the mid-point of the rear wall. The right surround loudspeakers are arranged along the along the right side wall and rear wall in a mirror image of the left surround loudspeaker arrangement. In addition, low frequency effect (LFE) or subwoofer loudspeakers (not shown), carrying non-directional low frequency sound, are usually located behind the screen 18, but may be located elsewhere. For simplicity, no LFE or subwoofer loudspeakers are shown in any of the drawings.

FIG. 2 shows an idealized loudspeaker arrangement for a typical theater 10 employing the Sony SDDS 7.1 channel system. The arrangement is the same as shown in FIG. 1 for the Dolby and DTS systems with the exception that the Sony SDDS system provides two additional main screen channels—a left center channel LC that is applied to left center loudspeaker(s) 13 and a right center channel RC that is applied to right center loudspeaker(s) 15.

All three digital motion picture sound systems provide at least three discrete main screen channels and two discrete surround sound channels. Although two surround sound channels are sufficient to satisfy the creators of and audiences for most multichannel sound motion pictures, there are, nevertheless, desires for more than two surround sound channels for some motion pictures.

The desire for more than two surround sound channels is addressed in two related patents (U.S. Pat. Nos. 5,602,923 and 5,717,765) that disclose an approach for providing additional surround-sound channels to the 7.1 channel Sony SDDS system. The patents point out that the SDDS system is "pushing the bandwidth limits of current motion picture technology in order to obtain the eight channels of information" and that "additional tracks are beyond the current practical bandwidth available on conventional motion picture film unless main or surround channel bandwidth is sacrificed."

The U.S. Pat. Nos. 5,602,923 and 5,717,765 patents add one or more very high frequency tones to the left surround and right surround channels in order to direct all or a portion of the information in a respective surround channel from the normal left surround and right surround loudspeakers to loudspeakers above the audience and above the motion picture screen. However, a shortcoming of that approach is its inability to reproduce different surround sound channels simultaneously from each of the more than two banks of surround sound loudspeakers. In other words, at any one time there are only two possible surround sound channels even though the loudspeaker locations that produce those channels may be varied.

Accordingly, there is still an unfulfilled need to provide more than two surround sound channels within the current formats of the Dolby Digital, Sony SDDS and DTS digital soundtrack systems.

SUMMARY OF THE INVENTION

It is an object of the present invention to provide more than two surround sound channels within the format of a digital soundtrack system designed to provide only two surround sound channels.

It is an object of the present invention to provide more than two surround sound channels within the format of a digital motion picture soundtrack system designed to provide only two surround sound channels, whether recorded on film or another medium synchronized with the picture.

It is another object of the present invention to provide more than two surround sound channels within the same digital audio stream of a digital soundtrack system designed to provide only two surround sound channels.

It is another object of the present invention to provide more than two surround sound channels in a digital soundtrack system designed to provide only two surround sound channels such that the ability of existing playback equipment to play two surround sound channels is unaffected.

It is another object of the present invention to provide more than two surround sound channels within the format of a digital soundtrack system designed to provide only two surround sound channels such that the medium carrying the digital soundtracks appears unaltered.

It is yet another object of the present invention to employ matrix encoding and decoding only for surround sound motion picture channels, which channels are relatively immune to crosstalk in matrix encoding and decoding.

It is yet a further object of the invention to employ discrete soundtrack channels for main screen sound channels where crosstalk is undesirable, but to employ matrix encoding for surround sound soundtrack channels where crosstalk is more acceptable due to the rearward directional characteristics of the human ear.

It is still a further object of the invention to employ discrete soundtrack channels for main screen sound channels where crosstalk is undesirable, but to employ matrix encoding for surround sound soundtrack channels where crosstalk is more acceptable due to the location of the surround sound channel loudspeakers in adjacent quadrants where crosstalk is relatively benign.

It is yet a further object of the invention to provide more than two surround sound channels in a digital motion picture soundtrack system which carries the digital information as optical symbols printed on motion picture film without increasing the density of optical symbols above that required to carry only two surround sound channels.

In accordance with the present invention more than two surround sound channels are provided within the format of a digital soundtrack system designed to provide only two surround sound channels. The digital audio stream of the digital soundtrack system designed to provide only two surround sound channels remains unaltered, thus providing compatibility with existing playback equipment. Moreover, the format of the media carrying the digital soundtracks is unaltered. In the case of the Dolby Digital and Sony SDDS systems, the digital information carrying symbols printed on the motion picture film remain unchanged the—symbol or "bit" size need not be reduced. In both the Dolby Digital and Sony SDDS systems, the optically recorded symbols represent digital information and the digital information, in turn, represents discrete motion picture soundtrack channels. Although, in theory, additional channels could be carried by reducing the symbol size in order to provide more bits and allowing the storage of more data in the same physical area, such a reduction would introduce unwanted difficulties in the printing process and require substantial modification of recorder and player units in the field. (In the same way, Dolby Laboratories rejected the approach of putting data on the opposite side of the film, with all the technical and economic problems that would ensue.) Full backward and forward compatibility is maintained.

In addition, the "discreteness" of the digital soundtrack system is not audibly diminished by employing matrix technology to surround sound channels, particularly if active matrix decoding is employed. The human ear's relative insensitivity with respect to rearward-originating sounds compared to the ear's sensitivity to forward-originating sounds makes the use of matrix encoding for surround channels highly acceptable in an otherwise discrete channel reproduction system (any crosstalk among surround channels behind the head is likely not to be perceived by the listener; moreover, crosstalk among channels in the same adjacent quadrants is more acceptable than crosstalk, for example, from the dialog-carrying center channel to the surround channel in an LCRS matrix system).

These and other objects, advantages and features of the invention will become apparent to those skilled in the art upon consideration of the present specification, drawings and claims.

Aspects of the invention include (1) a digital or analog format medium, such as motion picture film, magnetic tape, optical disc, or magneto-optical disc carrying discrete motion picture soundtracks in which two discrete surround-sound channels are matrix encoded with three, four or five surround-sound channels; (2) a method of producing motion picture soundtracks in which at least three main channels are recorded in discrete soundtrack channels and in which three, four or five surround-sound channels are matrix-encoded and recorded in two discrete surround-sound soundtrack channels; (3) a method of reproducing a motion picture soundtrack carried in at least five discrete motion picture soundtrack channels in which the discrete channels include two surround-sound channels, the two discrete surround-sound channels carrying three, four or five surround-sound matrix-encoded channels; and (4) apparatus for reproducing a motion picture soundtrack carried in at least five discrete motion picture soundtrack channels in which the discrete channels include two surround-sound channels, the two discrete surround-sound channels carrying three, four or five surround-sound matrix-encoded channels.

DESCRIPTION OF THE PREFERRED EMBODIMENTS

Figure 1:
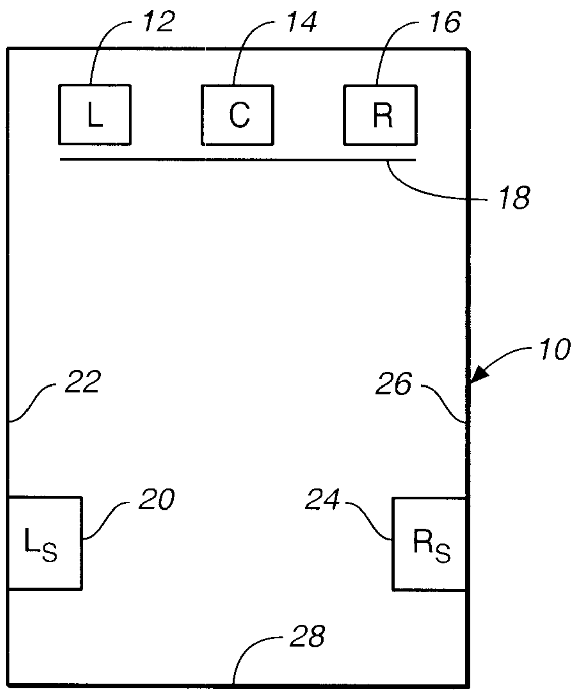
FIG. 1 (PRIOR ART)
FIG. 1 is a schematic plan view of a motion picture theater showing idealized loudspeaker locations for reproducing left (L), center (C), right (R), left surround ($L_S$) and right surround ($R_S$) motion picture soundtrack channels such as are provided by Dolby Digital and DTS digital soundtracks.
Figure 2:
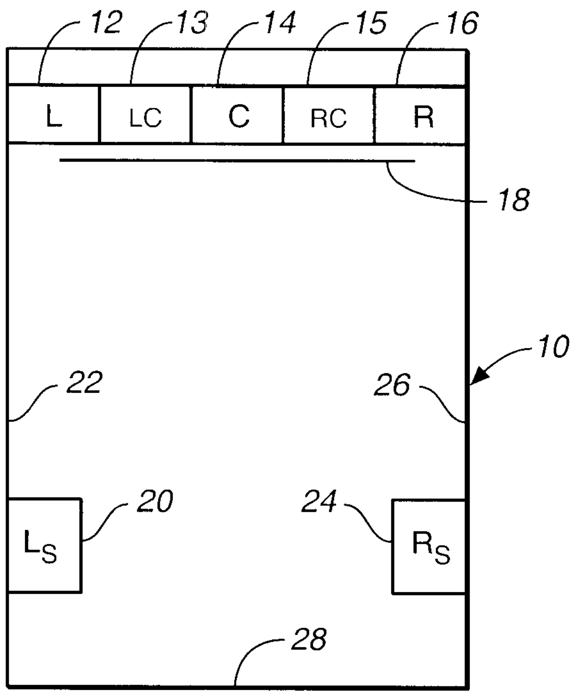
FIG. 2 (PRIOR ART)
FIG. 2 is a schematic plan view of a motion picture theater showing idealized loudspeaker locations for reproducing left (L), left center (LC), center (C), right center (RC), right (R), left surround ($L_S$) and right surround ($R_S$) motion picture soundtrack channels such as are provided by Sony SDDS digital soundtracks.
Figure 3:
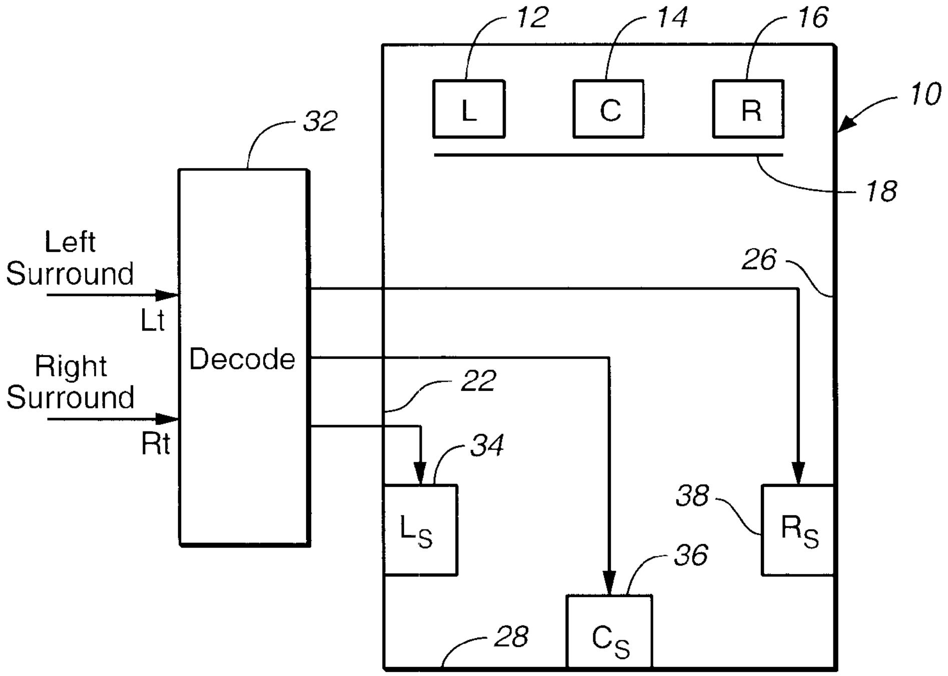
FIG. 3 is a schematic plan view of a motion picture theater showing an idealized loudspeaker arrangement according to a three surround channel embodiment of the invention.
Figure 4:
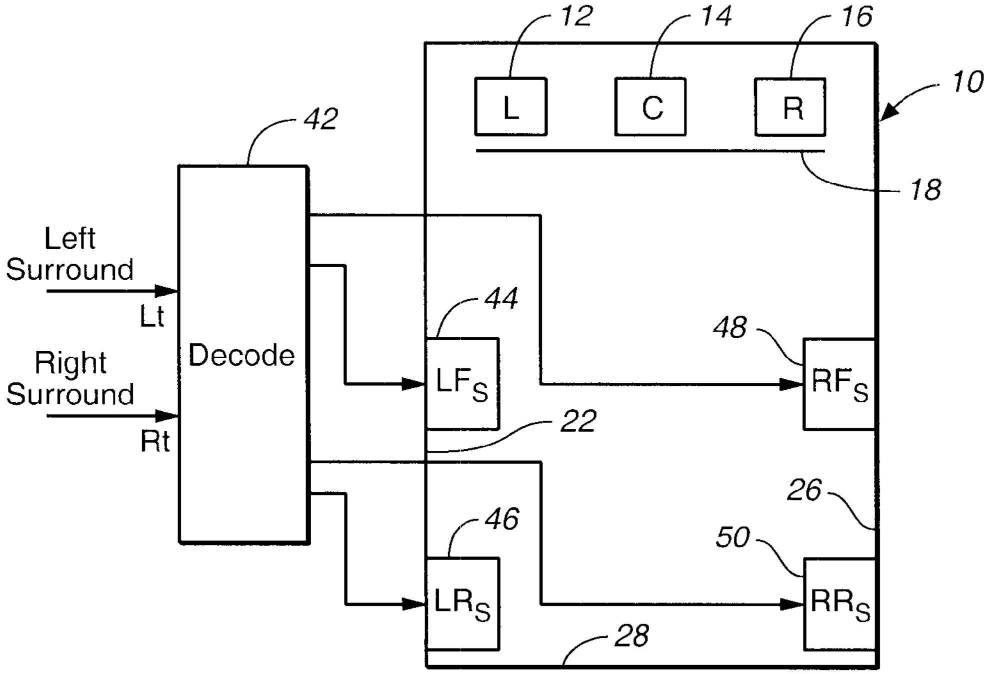
FIG. 4 is a schematic plan view of a motion picture theater showing an idealized loudspeaker arrangement according to a four surround channel embodiment of the invention.
Figure 5:
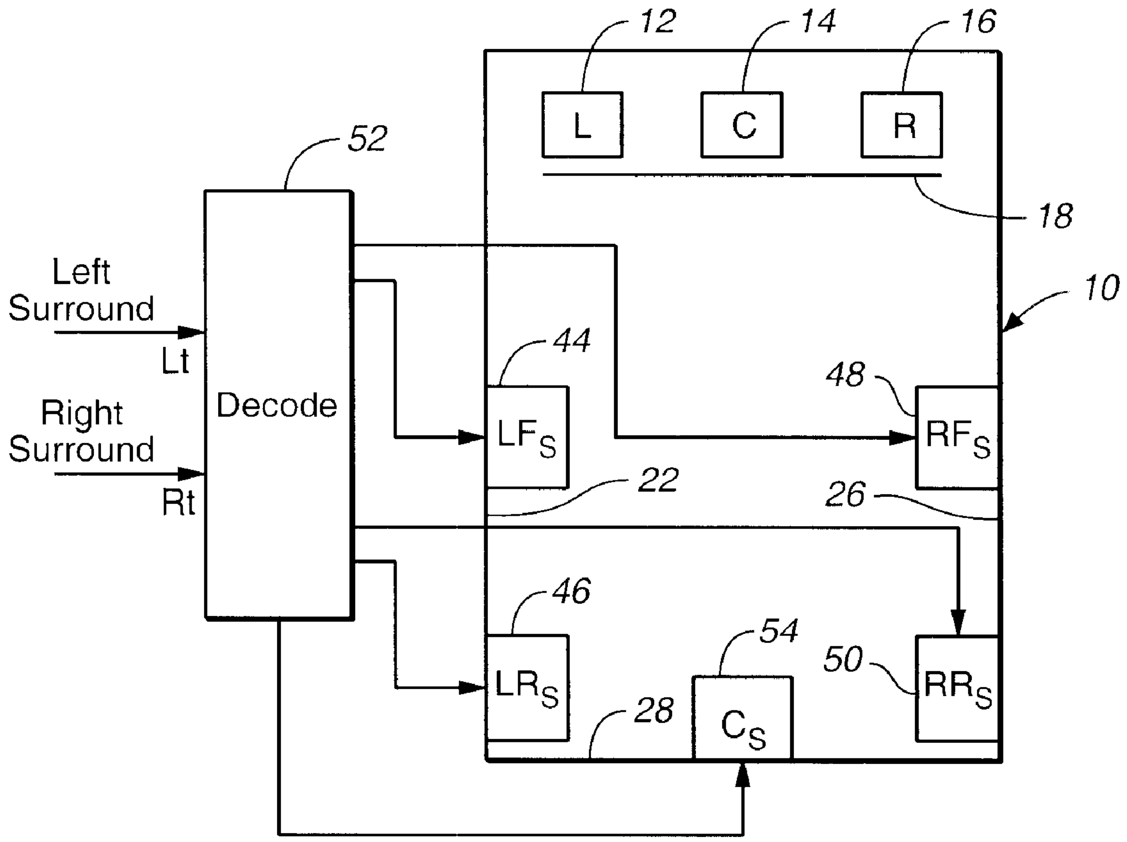
FIG. 5 is a schematic plan view of a motion picture theater showing an idealized loudspeaker arrangement according to a five surround channel embodiment of the invention.

Embodiments of the invention for providing playback of three, four and five surround sound channels in a digital soundtrack system designed to provide only two surround sound channels are shown in FIGS. 3, 4, and 5, respectively. Although only three main screen loudspeaker channels (L, C and R) are shown in FIGS. 3, 4, and 5, it is to be understood that five main screen loudspeaker channels (L, LC, C, RC and R) may be employed as in the manner of FIG. 2. The invention is equally applicable to and usable with the Dolby Digital, Sony SDDS and DTS digital soundtrack systems. The invention may also be applied to a discrete analog soundtrack system such as the six track magnetic 70 mm that employs discrete left surround and right surround tracks. In the various figures, like reference numerals are used to describe the same, similar or corresponding elements.

FIG. 3 shows an idealized loudspeaker arrangement for a typical theater 10 employing a three surround channel embodiment of the invention. The left surround and right surround channel audio streams from the Dolby Digital, Sony SDDS or DTS digital soundtrack decoding apparatus are applied to a 2:3 matrix decoder 32 as its $L_T$ (left total) and $R_T$ (right total) inputs. In this case, the left surround and right surround channel audio streams have been 3:2 matrix encoded with left surround ($L_S$), right surround ($R_S$) and center surround ($C_S$) audio inputs prior to the production of the respective Dolby Digital, Sony SDDS or DTS digital soundtrack. In other words, the $L_S$, $R_S$ and $C_S$ audio inputs are 3:2 matrix encoded into two surround audio inputs and those two surround audio inputs are applied along with the main screen and LFE inputs to the normal Dolby Digital, Sony SDDS or DTS digital soundtrack encoding and recording apparatus (not shown). The three de-matrixed surround sound channels $L_S$, $R_S$ and $C_S$ from decoder 32 are applied to the left surround loudspeaker(s) 34, the right surround loudspeaker(s) 38 and the center surround loudspeaker(s) 36, respectively. The surround loudspeaker locations are shown in idealized positions. In normal practice, there are a plurality of left surround loudspeakers spaced along the left side wall of the theater starting from a location about midway between the front and rear of the theater and extending to the rear wall 28. The right surround loudspeakers are spaced along the along the right side wall in a mirror image of the left surround loudspeaker arrangement. The center surround loudspeakers are spaced along the rear wall 28 of the theater.

FIG. 4 shows an idealized loudspeaker arrangement for a typical theater 10 employing a four surround channel embodiment of the invention. The left surround and right surround channel audio streams from the Dolby Digital, Sony SDDS or DTS digital soundtrack decoding apparatus are applied to a 2:4 matrix decoder 42 as its $L_T$ (left total) and $R_T$ (right total) inputs. In this case, the left surround and right surround channel audio streams have been 4:2 matrix encoded with left front surround ($LF_S$), left rear surround ($LR_S$), right front surround ($RF_S$), and right rear surround ($RR_S$) audio inputs prior to the production of the respective Dolby Digital, Sony SDDS or DTS digital soundtrack. In other words, the $LF_S$, $LR_S$, $RF_S$, and $RR_S$ audio inputs are 4:2 matrix encoded into two surround audio inputs and those two surround audio inputs are applied along with the main screen and LFE inputs to the normal Dolby Digital, Sony SDDS or DTS digital soundtrack encoding and recording apparatus (not shown). The four de-matrixed surround sound channels $LF_S$, $LR_S$, $RF_S$, and $RR_S$ from decoder 42 are applied to the left front surround loudspeaker(s) 44, the left rear surround loudspeaker(s) 46, the right front surround loudspeaker(s) 48 and the right rear surround loudspeaker(s) 50, respectively. The surround loudspeaker locations are shown in idealized positions. In normal practice, there are a plurality of left front surround loudspeakers spaced along the left side wall of the theater starting from a location about midway between the front and rear of the theater and extending about half way to the rear wall 28. There are a plurality of left rear surround loudspeakers spaced along the left side wall of the theater starting at a location spaced from the last of the left surround loudspeaker and extending to the rear wall 28 and then along the rear wall to a location near the mid-point of the rear wall. The right front and right rear surround loudspeakers are spaced along the right side wall and rear wall in a mirror image of the left surround loudspeaker arrangement.

FIG. 5 shows an idealized loudspeaker arrangement for a typical theater 10 employing a five surround channel embodiment of the invention. The left surround and right surround channel audio streams from the Dolby Digital, Sony SDDS or DTS digital soundtrack decoding apparatus are applied to a 2:5 matrix decoder 52 as its $L_T$ (left total) and $R_T$ (right total) inputs. In this case, the left surround and right surround channel audio streams have been 5:2 matrix encoded with left front surround ($LF_S$), left rear surround ($LR_S$), right front surround ($RF_S$), right rear surround ($RR_S$) and center surround ($C_S$) audio inputs prior to the production of the respective Dolby Digital, Sony SDDS or DTS digital soundtrack. In other words, the $LF_S$, $LR_S$, $RF_S$, and $RR_S$ audio inputs are 5:2 matrix encoded into two surround audio inputs and those two surround audio inputs are applied along with the main screen and LFE inputs to the normal Dolby Digital, Sony SDDS or DTS digital soundtrack encoding and recording apparatus (not shown). The five de-matrixed surround sound channels $LF_S$, $LR_S$, $RF_S$, $RR_S$ and $C_S$ from decoder 52 are applied to the left front surround loudspeaker (s) 44, the left rear surround loudspeaker(s) 46, the right front surround loudspeaker(s) 48, the right rear surround loudspeaker(s) 50, and the center surround loudspeaker(s), respectively. The surround loudspeaker locations are shown in idealized positions. In normal practice, there are a plurality of left front surround loudspeakers spaced along the left side wall of the theater starting from a location about midway between the front and rear of the theater and extending about half way to the rear wall 28. There are a plurality of left rear surround loudspeakers spaced along the left side wall of the theater starting at a location spaced from the last of the left surround loudspeaker and extending to the rear wall 28. The center surround loudspeakers are spaced along the rear wall 28 of the theater. The right front and right rear surround loudspeakers are spaced along the right side wall and rear wall in a mirror image of the left surround loudspeaker arrangement.

Although the invention is described in connection with encoding three, four or five surround channels into the two discrete surround channels available in the three digital motion picture soundtrack systems, it is believed that three surround channels may be optimum. There are several reasons for this. First, the human ear is relatively insensitive to direction behind the head and is unable to resolve a large number of sound source directions. Second, as the number of surround channels increases, the number of loudspeakers carrying each channel usually is reduced (the same number of surround loudspeakers are simply divided up among the available number of surround channels). As a bank of loudspeakers dedicated to a particular surround sound channel becomes smaller and tends toward becoming a point source, a listener's attention is more likely to be distracted away from the motion picture screen. Also, as listeners sit physically close to the loudspeakers of a particular surround channel, sounds from that channel tend to mask sounds coming from other surround loudspeakers carrying the audio for other surround channels. Three surround channels may be the optimum number to avoid exacerbating the masking problem in most practical theater environments.

In producing digital soundtracks in which the left surround and right surround tracks are matrix encoded with three surround sound channels, the MP 4:2 encode matrix is preferably employed as a 3:2 matrix by applying no input to the encode matrix's surround (S) input. The MP 3:2 encode matrix is defined by the following relationships:

$$L_T = L + 0.707C \quad \text{(Eqn. 1)}$$

$$R_T = R + 0.707C \quad \text{(Eqn. 2)}$$

where L is the Left channel signal, R is the Right channel signal, C is the Center channel signal and S is the Surround channel signal. Thus, the matrix encoder output signals are weighted sums of the three source signals. $L_T$ and $R_T$ are the matrix output signals.

The MP 2:3 decode matrix is defined by the following relationships:

$$L' = L_T \quad \text{(Eqn. 3)}$$

$$R' = R_T \quad \text{(Eqn. 4)}$$

$$C' = (L_T + R_T)/\sqrt{2} \quad \text{(Eqn. 5)}$$

where L' represents the decoded Left channel signal, R' represents the decoded Right channel signal and C' represents the decoded Center channel signal. Thus, the matrix decoder forms its output signals from weighted sums of the 3:2 encoder matrix output signals $L_T$ and $R_T$.

Due to the known shortcomings of a 3:2:3 matrix arrangement, the output signals L', C', R' and S' from the decoding matrix are not exactly the same as the corresponding four input signals to the encoding matrix. This is readily demonstrated by substituting the weighted values of L, C, and R from Equations 1 and 2 into Equations 3 through 5:

$$L' = L_T = L + 0.707C \quad \text{(Eqn. 3a)}$$

$$R' = R_T = R + 0.707C \quad \text{(Eqn. 4a)}$$

$$C' = (L_T + R_T)/\sqrt{2} = C + 0.707(L + R) \quad \text{(Eqn. 5a)}$$

The crosstalk component((0.707C) in the L' signal, etc.) are not desired but are a limitation of the basic 3:2:3 matrix technique. A preferred approach for improving the performance of a 2:3 MP matrix decoder is set forth in U.S. Pat. No. 5,046,098. The '098 patent and its parent U.S. Pat. No. 4,799,260 are directed to the fundamental elements of active matrix decoders known as Dolby Pro Logic decoders.

Figure 6:
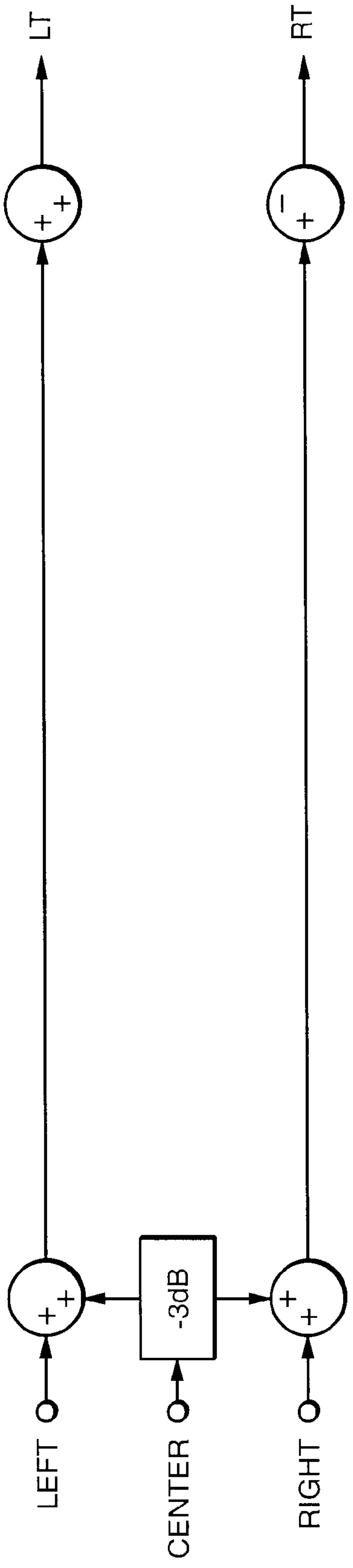
FIG. 6 (PRIOR ART)
FIG. 6 is an idealized functional block diagram of a conventional prior art Dolby MP Matrix encoder configured as a 3:2 encoder.

FIG. 6 is an idealized functional block diagram of a conventional prior art Dolby MP Matrix encoder configured as a 3:2 encoder. The encoder accepts three separate input signals; left, center, and right (L, C, R), and creates two final outputs, left-total and right-total (Lt and Rt). The C input is divided equally and summed with the L and R inputs with a 3 dB level reduction in order to maintain constant acoustic power.

The left-total (Lt) and right-total (Rt) encoded signals may be expressed as $$Lt = L + 0.707\ C;$$

and $$Rt = R + 0.707\ C,$$

where L is the left input signal, R is the right input signal, and C is the center input signal.

Audio signals encoded by a Dolby 3:2 MP matrix encoder may be decoded by a Dolby Surround decoder—a passive surround decoder, or a Dolby Pro Logic decoder—an active surround decoder. Passive decoders are limited in their ability to place sounds with precision for all listener positions due to inherent crosstalk limitations in the audio matrix. Dolby Pro Logic active decoders employ directional enhancement techniques which reduce such crosstalk components. Although passive surround decoders may be used, the decoders 32 and 42 of the FIGS. 3 and 4 embodiments, respectively, preferably are Dolby Pro Logic active decoders (if a Pro Logic 2:4 decoder is used, no output is taken from the surround output). Professional cinema processors manufactured by Dolby Laboratories, Inc. include such Dolby Pro Logic decoders (i.e., the Dolby CP45, the Dolby CP65 and the Dolby CP500 Cinema Processors).

Figure 7:
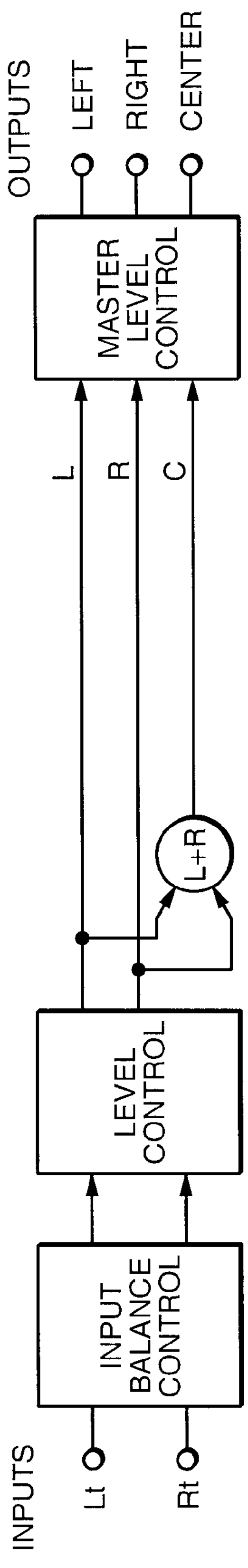
FIG. 7 (PRIOR ART)
FIG. 7 is an idealized functional block diagram of a passive surround 2:3 decoder capable of decoding Dolby MP matrix encoded signals.

FIG. 7 is an idealized functional block diagram of a passive surround decoder capable of decoding Dolby MP matrix encoded signals. Except for level and channel balance corrections, the Lt input signal passes unmodified and becomes the left output. The Rt input signal likewise becomes the right output. Lt and Rt also carry the center signal C, which is produced simply by summing Lt and Rt. While a passive decoder may be usable, it is preferred that a Dolby Pro Logic decoder is employed (configured as a 3:2 decoder) in order to provide more "discreteness" among the three decoded surround sound channels.

The MP matrix is not preferred for use in a 4:2:4 audio matrix systems of the present invention because the inherent diamond shape of the 4:2:4 MP matrix is designed to favor a diamond-shaped arrangement in which three of the channels (L/C/R) are screen located. Instead, for the 4:2:4 matrix embodiment, it is preferred to employ the "QS" (or alternatively, the "SQ") matrix systems. The "QS" and "SQ" systems were the bases of two competing quadraphonic sound systems introduced in the 1970's by Sansui and CBS, respectively. Details of both systems are well known in the art (see, for example, "Quadraphony Anthology," Audio Engineering Society, 1975 and articles reprinted therein, particularly: "Multichannel Stereo Matrix Systems: An Overview" by John M. Eargle, pp. 94–101; "Quadraphonic Matrix Perspective—Advances in SQ Encoding and Decoding Technology" by Benjamin B. Bauer, et al of CBS, pp. 102–110; "Proposed Universal Encoding Standards for Compatible Four-Channel Matrixing" by R. Itoh of Sansui, pp. 125–131; "4-2-4 Matrix Systems: Standards, Practice, and Interchangeability" by John Eargle, pp. 132–138. See also, "Quadraphony—A Review" by J. G. Woodward, *Journal of the Audio Engineering Society*, October/November 1977, Vol. 25, No. 10/11, pp. 843–854 and the references cited in the bibliography thereof). Both QS and SQ employ square-shaped arrangements, a shape which is more appropriate for surround channels arranged in the manner of the FIG. 4 embodiment. As with the 3:2:3 embodiment, while a passive 2:4 decoder may be employed with reduced performance, it is preferred that the 2:4 decoder of the 4:2:4 embodiment employ an active decoder. Many active QS and SQ decoders are well known in the art.

With regard to the 2:5 decoder 52 of the FIG. 5 embodiment, such decoders, along with complementary 5:2 encoders are also well known in the art. One such 5:2:5 matrix encoding and decoding system is described in U.S.

Pat. No. 5,319,713 and in a paper entitled "The Circle Surround 5.2.5 5-Channel Surround System White Paper" by James K. Waller, Jr., available on the world wide web of the Internet.

Although the invention thus far has been described particularly in connection with the Dolby Digital, Sony SDDS, and DTS motion picture soundtrack systems, it should be understood that the invention is not limited to those systems nor to the presentation formats of those systems. The invention may be used in connection with other presentation formats, including formats yet to be developed, and may be used in connection with the production of known and future presentation formats. For example, the invention may be used in connection with the production of master recordings from which the presentation formats are produced.

Thus, the invention is applicable generally to a medium carrying at least five discrete motion picture soundtrack channels, wherein the discrete channels include two discrete surround-sound channels, the two discrete surround-sound channels carrying three, four or five surround-sound matrix-encoded channels. The discrete motion picture channels may be carried on the medium in a digital format, in which case the medium may be any of the following:

- motion picture film having optically recorded symbols representing digital information, the digital information, in turn, representing said discrete motion picture soundtrack channels (examples include the presentation format of the Dolby Digital and Sony SDDS systems) (see, for example, U.S. Pat. Nos. 5,544,140; 5,621,489; 5,639,585; 5,710,752; and 5,757,465);
- an optical disc having pits impressed in the disc surface representing digital information, the digital information, in turn, representing the discrete motion picture soundtrack channels;
- an optical disc having pits impressed in the disc surface representing digital information, the digital information, in turn, representing the discrete motion picture soundtrack channels, wherein the optical disc is a compact disc (an example includes the presentation format of the DTS system);
- a magneto-optical disc having magnetically-oriented particles representing digital information, the digital information, in turn, representing the discrete motion picture soundtrack channels; or
- a magnetic tape having magnetically-oriented particles representing digital information, the digital information, in turn, representing the discrete motion picture soundtrack channels.

The discrete motion picture channels may be carried on the medium in an analog format, in which case the medium may be either of the following:

- a motion picture film with one or more magnetizable coatings having tracks of magnetically-oriented particles representing analog information, each track carrying a discrete motion picture soundtrack channel, or
- magnetic tape having tracks of magnetically-oriented particles representing analog information, each track carrying a discrete motion picture soundtrack channel.

In any of the above listed cases, the surround-sound channels preferably are matrix encoded for compatible reproduction when the two discrete surround-sound channels are reproduced without matrix decoding. Thus, backward compatibility is preserved. The required phase relationships for maintaining compatible two channel playback are well known in the art.

Recording motion picture soundtracks in accordance with the present invention may be accomplished by (1) mixing sound information for at least three main screen sound channels and for three, four or five surround-sound channels, (2) matrix encoding the three, four or five surround-sound channels into two matrix-encoded surround-sound channels, and (3) recording the at least three main screen sound channels and the two matrix-encoded surround-sound channels in respective discrete soundtrack channels. Suitable mixing techniques are well known in the art. With respect to matrix encoding, as discussed above, in the case of three surround-sound channels, the three-channel version of the Dolby MP encode matrix preferably is employed, in the case of four surround-sound channels, the QS matrix preferably is employed, and, in the case of five surround-sound channels, the encode matrix of any suitable known 5:2:5 matrix system may be employed. Techniques for recording sound channels in discrete soundtracks are known in the art (see, for example U.S. Pat. Nos. 5,453,802; 5,600,617; and 5,639,585).

In producing motion picture soundtracks in accordance with the invention, matrix encoding may be done before or after recording the master recording. When matrix encoding is done after recording the master recording, producing the motion picture soundtracks may be accomplished by (1) mixing sound information for at least three main sound channels and for three, four or five surround-sound channels, (2) recording the main sound channels and the surround-sound channels in discrete channels, respectively, on a master recording, (3) reproducing from the master recording the main sound channels and the surround-sound channels, and (4) matrix encoding the three, four or five surround-sound channels into two matrix-encoded surround-sound channels. The master recording may be digital employing, for example, any of the digital formats set forth above, or analog, employing, for example, any of the analog formats set forth above.

Further steps in producing the motion picture soundtracks may include (5) producing optical symbols representing digital information, the digital information, in turn, representing discrete motion picture soundtrack channels in response, respectively, to the main sound channels reproduced from the master recording and the two matrix-encoded surround-sound channels encoded from the surround-sound channels reproduced from the master recording, and (6) photographically printing the optical symbols on motion picture film to produce a master sound negative film print. Producing optical symbols is preferably accomplished as in the Dolby Digital system described in said U.S. Pat. Nos. 5,544,140, 5,583,962, 5,710,752 and 5,757,465 patents and in the cited AC-3 paper. Alternatively, optical symbols may be produced as in accordance with the Sony SDDS system. Techniques for printing such symbols on a motion picture film to produce a master sound negative film print are well known in the art.

Alternatively, a further step in producing the motion picture soundtracks may include producing an optical disc containing digitally-encoded audio information representing discrete motion picture soundtrack channels in response, respectively, to the main sound channels reproduced from the master recording and the two matrix-encoded surround-sound channels encoded from the surround-sound channels reproduced from the master recording. Various techniques for digitally encoding audio information and recording the encoded information on an optical disc are well known in the art.

As noted above, matrix encoding may be done before or after recording the master recording. It should be understood that statements regarding particular steps set forth above apply also to corresponding steps discussed below. When matrix encoding is done before recording the master recording, producing the motion picture soundtracks may be accomplished by (1) mixing sound information for at least three main sound channels and for three, four or five surround-sound channels, (2) matrix encoding the three, four or five surround-sound channels into two matrix-encoded surround-sound channels, and (3) recording the main sound channels and the two matrix-encoded surround-sound channels in discrete channels, respectively, on a master recording.

Further steps in producing the motion picture soundtracks may include (4) producing optical symbols representing digital information, the digital information, in turn, representing discrete motion picture soundtrack channels in response, respectively, to the main sound channels and the two matrix-encoded surround-sound channels recorded on the master recording, and (5) photographically printing the optical symbols on motion picture film to produce a master sound negative film print.

Alternatively, a further step in producing the motion picture soundtracks may include producing an optical disc containing digitally-encoded audio information representing discrete motion picture soundtrack channels in response, respectively, to the main sound channels and the two matrix-encoded surround-sound channels recorded on said master recording.

Whether matrix encoding is done before or after recording the master recording, the master recording may be any one of the following: (1) a magneto-optical disc recording (this is preferred in producing a Dolby Digital soundtrack), (2) a magnetic tape recording in which the recorded information represents digital information, (3) a magnetic stripe on film recording in which the recorded information represents analog information, or (4) a magnetic tape recording in which the recorded information represents analog information.

A composite motion picture film print may be made from the master sound negative film print and a master picture element negative film print. Various techniques for doing so are well known in the art.

We claim:

1. A method for recording motion picture soundtracks, comprising mixing sound information for at least three main screen sound channels and for three, four or five surround-sound channels, matrix encoding said three, four or five surround-sound channels into two matrix-encoded surround-sound channels, whereby said two matrix-encoded surround-sound channels jointly carry said three, four or five surround-sound channels, and recording said at least three main screen sound channels and said two matrix-encoded surround-sound channels in respective discrete soundtrack channels.

2. A method for producing motion picture soundtracks, comprising mixing sound information for at least three main screen sound channels and for three, four or five surround-sound channels, recording said main screen sound channels and said surround-sound channels in discrete channels, respectively, on a master recording, reproducing from said master recording said main screen sound channels and said surround-sound channels, and matrix encoding said three, four or five surround-sound channels into two matrix-encoded surround-sound channels whereby said two matrix-encoded surround-sound channels jointly carry said three, four or five surround-sound channels.

3. A method according to claim 2 further comprising producing optical symbols representing digital information, the digital information, in turn, representing discrete motion picture soundtrack channels in response, respectively, to the main screen sound channels reproduced from said master recording and the two matrix-encoded surround-sound channels encoded from the surround-sound channels reproduced from said master recording, and photographically printing said optical symbols on motion picture film to produce a master sound negative film print.

4. A method according to claim 2 further comprising producing an optical disc containing digitally-encoded audio information representing discrete motion picture soundtrack channels in response, respectively, to the main screen sound channels reproduced from said master recording and the two matrix-encoded surround-sound channels encoded from the surround-sound channels reproduced from said master recording.

5. A method for producing motion picture soundtracks, comprising mixing sound information for at least three main screen sound channels and for three, four or five surround-sound channels, matrix encoding said three, four or five surround-sound channels into two matrix-encoded surround-sound channels, whereby said two matrix-encoded surround-sound channels jointly carry said three, four or five surround-sound channels, and recording said main screen sound channels and said two matrix-encoded surround-sound channels in discrete channels, respectively, on a master recording.

6. A method according to claim 5 further comprising producing optical symbols representing digital information, the digital information, in turn, representing discrete motion picture soundtrack channels in response, respectively, to the main screen sound channels and the two matrix-encoded surround-sound channels recorded on said master recording, and photographically printing said optical symbols on motion picture film to produce a master sound negative film print.

7. A method according to claim 5 further comprising producing an optical disc containing digitally-encoded audio information representing discrete motion picture soundtrack channels in response, respectively, to the main screen sound channels and the two matrix-encoded surround-sound channels recorded on said master recording.

8. A method according to any one of claims 2–7 wherein said master recording is a magneto-optical disc recording.

9. A method according to any one of claims 2–7 wherein said master recording is a magnetic tape recording in which the recorded information represents digital information.

10. A method according to any one of claims 2–7 wherein said master recording is a magnetic stripe on film recording in which the recorded information represents analog information.

11. A method according to any one of claims 2–7 wherein said master recording is a magnetic tape recording in which the recorded information represents analog information.

12. A method according to any one of claims 2–7 further comprising producing a composite motion picture film print from said master sound negative film print and a master picture element negative film print.

13. A method of reproducing a motion picture soundtrack carried in at least five discrete motion picture soundtrack channels, wherein said discrete channels include two surround-sound channels, said two discrete surround-sound channels jointly carrying three, four or five surround-sound matrix-encoded channels, comprising applying the discrete soundtrack channels other than said two surround-sound channels to respective sound reproduction paths, matrix decoding said two surround-sound channels that jointly carry three, four or five surround-sound matrix encoded channels to provide three, four or five surround-sound channels, and applying the surround-sound channels to respective sound reproduction paths.

14. A method for recording and reproducing a motion picture soundtrack, comprising recording at least five discrete motion picture soundtrack channels, wherein said discrete channels include two surround-sound channels, said two discrete surround-sound channels jointly carrying three, four or five surround-sound matrix-encoded channels, reproducing said at least five discrete motion picture soundtrack channels, applying the discrete soundtrack channels other than said two surround-sound channels to respective sound reproduction paths, matrix decoding said two surround-sound channels that jointly carry three, four or five surround-sound matrix encoded channels to provide three, four or five surround-sound channels, and applying the surround-sound channels to respective sound reproduction paths.

15. A method of reproducing a motion picture soundtrack, comprising receiving at least five discrete motion picture soundtrack channels, wherein said discrete channels include two surround-sound channels, said two discrete surround-sound channels jointly carrying three, four or five surround-sound matrix-encoded channels, applying the discrete soundtrack channels other than said two surround-sound channels to respective sound reproduction paths, matrix decoding said two surround-sound channels that jointly carry three, four or five surround-sound matrix encoded channels to provide three, four or five surround-sound channels, and applying the surround-sound channels to respective sound reproduction paths.

16. A method for recording motion picture soundtracks representing at least three main screen sound channels and three, four or five surround-sound channels, comprising matrix encoding said three, four or five surround-sound channels into two matrix-encoded surround-sound channels, whereby said two matrix-encoded surround-sound channels jointly carry said three, four or five surround-sound channels, and recording said at least three main screen sound channels and said two matrix-encoded surround-sound channels in respective discrete soundtrack channels.

17. A method for producing motion picture soundtracks representing at least three main screen sound channels and three, four or five surround-sound channels, comprising recording said main screen sound channels and said surround-sound channels in discrete channels, respectively, on a master recording, reproducing from said master recording said main screen sound channels and said surround-sound channels, and matrix encoding said three, four or five surround-sound channels into two matrix-encoded surround-sound channels whereby said two matrix-encoded surround-sound channels jointly carry said three, four or five surround-sound channels.

18. A method for producing motion picture soundtracks representing at least three main screen sound channels and three, four or five surround-sound channels, comprising matrix encoding said three, four or five surround-sound channels into two matrix-encoded surround-sound channels, whereby said two matrix-encoded surround-sound channels jointly carry said three, four or five surround-sound channels, and recording said main screen sound channels and said two matrix-encoded surround-sound channels in discrete channels, respectively, on a master recording.

* * * * *